United States Patent
Schneider

(10) Patent No.: US 6,647,757 B1
(45) Date of Patent: Nov. 18, 2003

(54) METHOD FOR RECOGNITION OF SIGNAL ERRORS

(75) Inventor: Thomas Schneider, Markgroeningen (DE)

(73) Assignee: Robert Bosch GmbH, Stuttgart (DE)

(*) Notice: Subject to any disclaimer, the term of this patent is extended or adjusted under 35 U.S.C. 154(b) by 247 days.

(21) Appl. No.: 09/869,945

(22) PCT Filed: Nov. 23, 2000

(86) PCT No.: PCT/DE00/04150

§ 371 (c)(1),
(2), (4) Date: Jul. 9, 2001

(87) PCT Pub. No.: WO01/46703

PCT Pub. Date: Jun. 28, 2001

(30) Foreign Application Priority Data

Dec. 20, 1999 (DE) .......................................... 199 61 504

(51) Int. Cl.$^7$ ............................................... G01M 15/00
(52) U.S. Cl. ....................................................... 73/1.41
(58) Field of Search ................................. 73/1.37, 1.41

(56) References Cited

U.S. PATENT DOCUMENTS

| 4,715,009 A | | 12/1987 | Bohmler |
| 4,915,079 A | * | 4/1990 | Holmes |
| 5,056,360 A | * | 10/1991 | Dosdall et al. ................ 73/116 |

FOREIGN PATENT DOCUMENTS

| EP | 0 193 335 B | 9/1986 |
| EP | 0 589 799 A | 3/1994 |
| EP | 0 665 375 A | 8/1995 |
| EP | 0 684 480 A | 11/1995 |

* cited by examiner

*Primary Examiner*—Robert Raevis
(74) *Attorney, Agent, or Firm*—Michael J. Striker

(57) ABSTRACT

The invention relates to a method for detecting rpm signal errors, in which pulses ($t_0$, $t_2$, $t_4$, $t_6$, $t_8$ and $t_{10}$) and pulse intervals ($t_1$, $t_3$, $t_5$, $t_7$, $t_9$) are generated by poles that generate rpm signals and are disposed on the circumference of a pole wheel. To ascertain a change in speed, pulse intervals ($t_1$, $t_3$, $t_7$, $t_9$) within a first allowable tolerance range are compared in a first step for equality and in a second step for inequality in terms of duration, during one wheel revolution.

8 Claims, 2 Drawing Sheets

METHOD FOR RECOGNITION OF SIGNAL ERRORS

FIELD OF THE INVENTION

Figure 1:
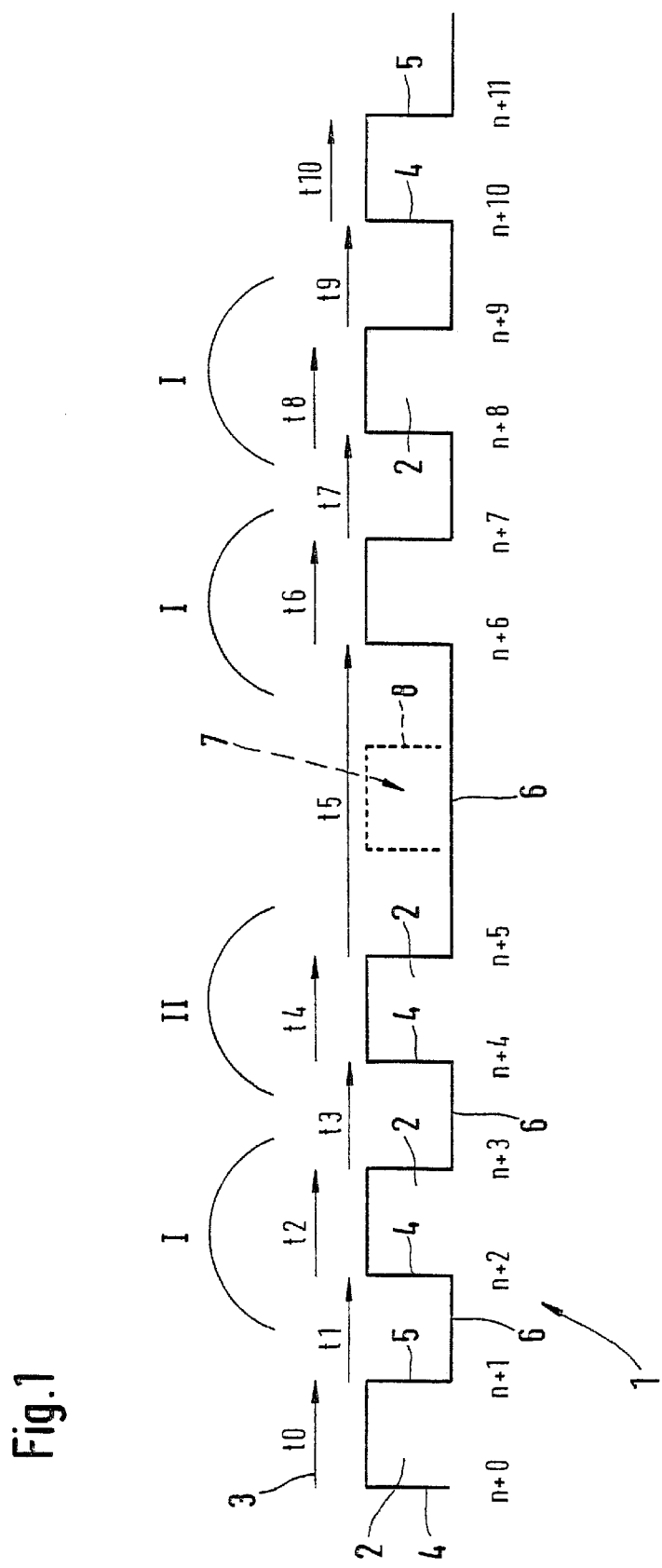

The invention relates to a method for detecting signal errors, in particular for detecting rpm signal errors, in order to detect missing signals and to distinguish those errors from changes in rpm. Distinguishing missing signals from rpm changes is significant if unintentional tripping, or tripping that is not authorized by the existing driving situation of a motor vehicle, of antilock and traction control systems in motor vehicles are to be prevented.

PRIOR ART

European Patent Disclosure EP 0 193 335 B1 discloses a device for detecting an anomaly in a rotary speed sensor. This sensor is used to detect a rotary speed of a rotating body. An electronic device is provided which responds to a signal of the rotary speed sensor in order to measure an interval between successive signals. Devices are also provided for estimating a time period, from the previously measured time interval; within the time period, a subsequent signal is generated by the rotary speed sensor. Devices are also known that detect an anomaly of the rotary speed sensor if the signal is not generated within the estimated period of time. In this method, the estimation of a new period of time is done by adding a fixed time difference to the applicable preceding period of time. Because of the estimate that must be made, the method proposed in EP 0 193 335 B1 is subject to imprecision.

In technical applications, such as automobile manufacture, active sensors are increasingly used at present. When such sensors are used, gear wheels are increasingly being replaced by magnet rings (multipoles). In maintenance work or at repair facilities, these magnet rings can be damaged by incorrect manipulation, for example, or impaired by magnetic dirt sticking to them. The dirt adhering to the magnet rings, like damage to the magnet rings, can lead to missing signals. This can mean that entire pole segments are blanked out, which in antilock or traction control systems can mean that the system will respond to the absence of rpm pulses even though no critical driving situation exists, yet the ABS or TCS does perform control functions.

SUMMARY OF THE INVENTION

With the method proposed according to the invention, rpm changes can be very easily distinguished from errors without requiring the presence of a reference signal. There is no need for the wheel or wheels whose rpm is to be scanned to be moved into specified circumferential positions, for the method proposed by the invention to be usable. The proposed method can be realized in software form or by means of hardware components; the expense for hardware components is considered low. The test conditions to be performed independently of one another make reliable detection of phases of speed change impossible, that is, acceleration and deceleration, so that these phases can be distinguished from incident errors. The test routine with two comparisons independent from one another can be performed over a plurality of wheel revolutions, making a simply designed filtering feasible. With the method proposed according to the invention, the absence of individual poles and/or of entire pole segments can easily be detected.

An assessment of each individual wheel of the motor vehicle is possible independently of the other wheels, and so scattering per wheel can very easily be distinguished from genuine signal errors.

DRAWING

Figure 2:
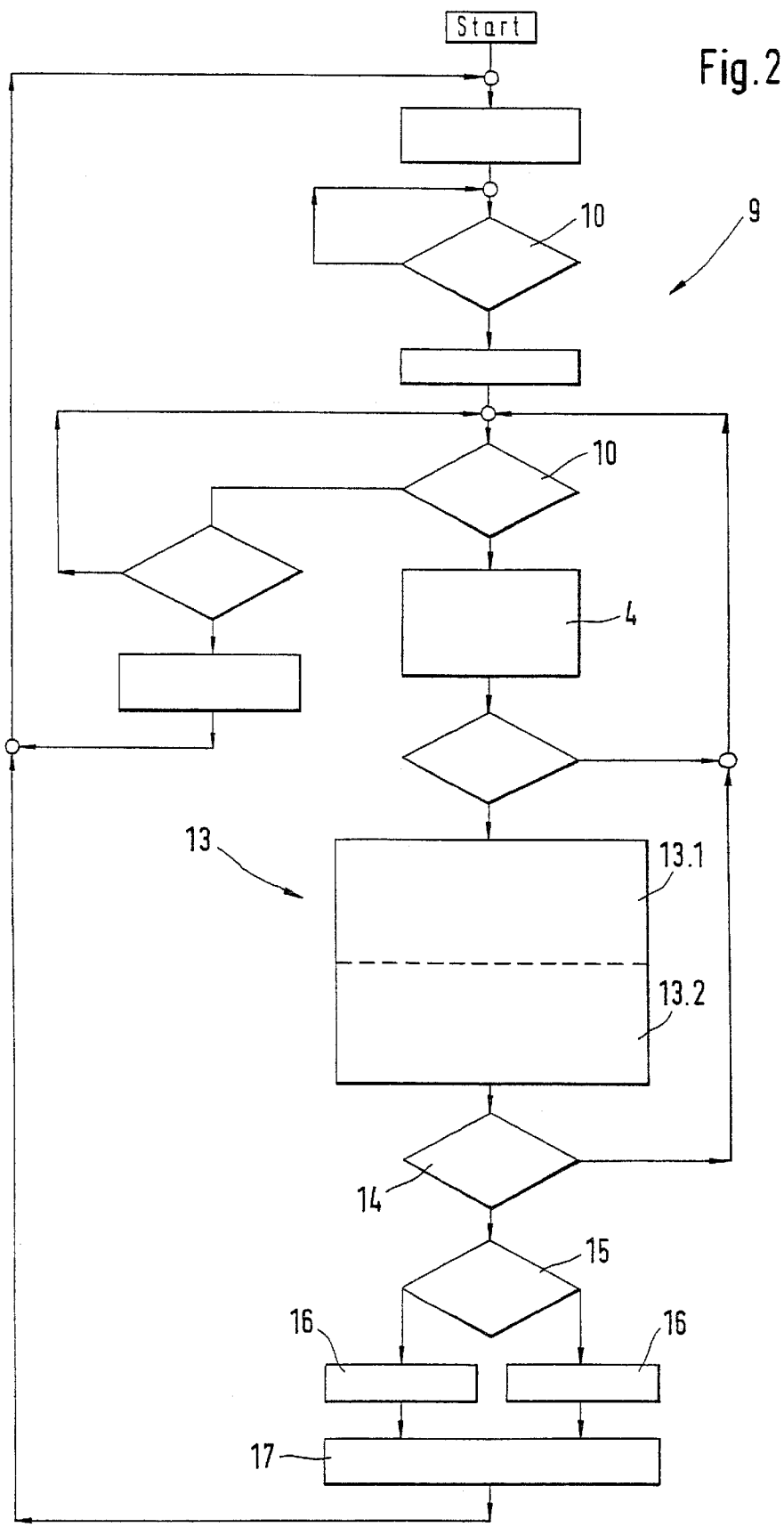

The invention will be described in detail below in conjunction with the drawing:

Shown are:

FIG. 1, a signal diagram with a missing pulse at $t_5$ and a longer pulse interval that then ensues;

FIG. 2, a flow chart which is run through in order to detect errors in a pole wheel with 48 poles and to store them in storage media.

VARIANT EMBODIMENTS

In FIG. 1, a signal diagram is shown in which a relatively long-lasting pulse interval that ensues exists over the period of time $t_n = t_5$.

The pulse train generated by the poles on the circumference of a pole wheel having 48 poles, for example, is indicated by reference numeral 1 in FIG. 1. The number of pulses, increasing from left to right from n, can be subdivided into pulses 2 and pulse intervals 6. In the exemplary embodiment shown, the even-numbered subscripts represent pulses 2, while the pulse intervals 6 are represented by odd-numbered subscripts. The pulses 2 are each characterized by one vertically leading edge 4 and one vertically trailing edge 5.

During the pulse interval 6 that lasts for the period of time $t_5$, where n=5, a missing signal has occurred. The pulse 8 represented by dashed lines did not take place, and therefore the pulse interval 6 at $t=t_5$ has increased to a multiple of its original length. This is then followed, beginning at $t=t_6$, by a regular succession of pulses 2 and pulse intervals 6 in the signal train 1.

The curves marked I and II above the signal train 1 and pulse train shown indicate which comparison operations are performed. With test condition I, it is ascertained whether a speed change in the wheel to be checked exists or not. The question is asked whether the conditions $t_1 < 2 \times t_3$ and $t_3 < 2 \times t_1$ is met. If this condition is met, no speed change of the wheel is taking place; the applicable wheel is moving at a constant circumferential speed. Conversely, if the condition is not met, then the wheel is in either an acceleration or a deceleration phase. This comparison operation, performed in the context of the first step, is also performed for the more advanced ranges of the signal train 1, such as $t_7 < 2 \times t_9$ and $t_9 < 2 \times t_7$. If this equality condition is met, the information is obtained that no change in the speed of the applicable wheel is found, since the pulse lengths 3 are each the same.

In addition to the criteria checked in the first comparison operation, an inequality criterion is checked in a comparison operation II in the context of a comparison. The question is asked whether $t_5 > 2 \times t_3$ and $t_5 > 2 \times t_7$. If this inequality condition is met, then it is highly likely that a missing signal has occurred. The missing signal is represented by dashed lines for the absent pulse 8 in FIG. 1. As a result, the pulse span 6 has assumed a markedly longer duration, which in the ideal case can amount to at least $2 \times t_n$ and can be used to evaluate an inequality condition.

Within the comparison operation I, including both comparisons $t_1 < 2 \times t_3$ and $t_3 < 2 \times t_1$ on the one hand and $t_7 < 2 \times t_9$ and $t_9 < 2 \times t_7$ on the other, the presence of a speed change is ascertained, while the second comparison operation functions with the conditions $t_5 > 2 \times t_3$ and $t_5 > 2 \times t_7$. In the context of the comparison operation II, whether the length of the pulse duration at $t_5$ exceeds a minimum length, which can be determined and specified by the factor of 2, is stored in memory. The preferred use of the factor 2 is due to the fact that given an ideal duty cycle, the duration of the pulse interval 6 would have to amount to at $n=n+5:3 \times t_n$. If real ratios are made the basis, then duty cycles of between 0.3 and 0.7 should be assumed, which is why the minimum criterion beyond which the length 3 of the pulse interval 6 is to be considered as excessively long should be set as $t_5 > 2 \times t_n$.

The two comparison operations I and II of the method proposed by the invention can be performed independently of one another, since a signal error-at two instants can be detected, namely first upon its occurrence and again when it disappears. The independence of the comparison operations I and II from one another is required since the length of the errors, or in this example the length 3 of the pulse interval 6, is not known, just as the number of missing edges is not known. Because of the independence of the two comparison operations I, II from one another, a plurality of error packets or segments within a signal train can thus be detected, and by comparison good packets or segments on the pole wheel that are neither damaged nor soiled can also be detected.

FIG. 2 shows a flow chart which is run through in order to detect errors in a pole wheel, for instance having 48 poles, and storing them in a storage medium.

In the flow chart 9 of FIG. 2, it is shown that by means of an edge detector 10, a detection of the edges 4, 9 of the pulses 2 is done, and these edges are counted upward inside a time memory 11, in accordance with the counted order, where n=n+1, n+2 . . . Only once a number of eight edges that have moved past the pulse transducer is detected are the comparison operations I and II, described in conjunction with FIG. 1, performed within the comparison routine 13. The comparison routine 13 can be roughly subdivided into two memory regions 13.1 and 13.2. In the first memory region 13.1, the partial comparisons of the comparison operations I, II take place that are shown in FIG. 1 before the absent signal 8 in the signal train 1, while in memory region 13.2, the comparison operations I and II are performed that occur to the right of the missing signal 8.

The comparison routine 13 is active until such time as edges 4, 5, in a 48-pole wheel 96, are evaluated, which corresponds to one complete wheel revolution. This is evaluated in a revolution counter 14, from which a jump back to the beginning is either made, or the memory regions 13.1 and 13.2 are evaluated.

The error information 16 stored in the two storage media can be displayed and output via a display 17. The course of the method in accordance with the flow chart 9 can be performed independently for each wheel and can be added together over a plurality of revolutions of the wheel, so that scattering can be very easily distinguished from genuine signal errors.

List of Reference Numerals

1 Pulse train
2 Pulse
3 Pulse length
4 Pulse edge
5 Pulse edge
6 Pulse interval
7 Missing signal
8 Absent signal
9 Flow chart
10 Edge detector
11 Time memory
12 Edge counter
13 Comparison routine
13.1 First memory region
13.2 Second memory region
14 Revolution counter
15 Evaluation
16 Error
17 Error display
I Equality comparison
II Inequality comparison

What is claimed is:

1. A method for detecting rpm signal errors, in which pulses ($t_0$, $t_2$, $t_4$, $t_6$, $t_8$ and $t_{10}$) and pulse intervals ($t_1$, $t_3$, $t_5$, $t_7$, $t_9$) are generated by poles that generate rpm signals and are disposed on the circumference of a pole wheel, characterized in that to ascertain a change in speed, pulse intervals ($t_1$, $t_3$, $t_7$, $t_9$) within a first allowable tolerance range are compared in a first step for equality and in a second step for inequality in terms of duration, during one wheel revolution.

2. The method of claim 1, characterized in that within the first step, the condition $t_{(n+1)} < X \times t_{(n+3)}$ and $t_{(n+3)} < X \times t_{(n+1)}$ is checked in order to ascertain the change in speed.

3. The method of claim 1, characterized in that within the first step, the condition $t_{(n+7)} < 2 \times t_{(n+9)}$ and $t_{(n+9)} < 2 \times t_{(n+7)}$ is checked in order to ascertain the change in speed.

4. The method of claim 1, characterized in that within the second step, the conditions $t_{(n+5)} < X \times t_{(n+3)}$ and $t_{(n+3)} < X \times t_{(n+5)}$ is checked.

5. The method of claim 2, characterized in that the factor X assumes the value of 2.

6. The method of claim 5, characterized in that the factor X assumes the value of 2, on the basis of a duty cycle between 0.3 and 0.7.

7. The method of claim 1, characterized in that it is concluded that a signal error is present if the signal error is ascertained twice.

8. The method of claim 1, characterized in that the first step and the second step are performed independently of one another.

* * * * *